United States Patent
Canfield et al.

(10) Patent No.: US 7,498,781 B2
(45) Date of Patent: Mar. 3, 2009

(54) METHODS AND SYSTEMS FOR DISTURBANCE REJECTION IN DC-TO-DC CONVERTERS

(75) Inventors: John C. Canfield, Newmarket, NH (US); Paul W. Latham, Lee, NH (US)

(73) Assignee: L&L Engineering LLC, Lee, NH (US)

( * ) Notice: Subject to any disclaimer, the term of this patent is extended or adjusted under 35 U.S.C. 154(b) by 0 days.

(21) Appl. No.: 11/695,264

(22) Filed: Apr. 2, 2007

(65) Prior Publication Data

US 2007/0236200 A1 Oct. 11, 2007

Related U.S. Application Data

(60) Provisional application No. 60/790,247, filed on Apr. 7, 2006.

(51) Int. Cl.
G05F 1/565 (2006.01)
G05F 1/575 (2006.01)

(52) U.S. Cl. .................................. 323/280; 323/285

(58) Field of Classification Search ................ 323/222, 323/224, 282, 283, 285
See application file for complete search history.

(56) References Cited

U.S. PATENT DOCUMENTS

| | | | |
|---|---|---|---|
| 5,563,817 A | 10/1996 | Ziegler, Jr. et al. | 364/724.19 |
| 5,627,896 A | 5/1997 | Southward et al. | 381/71 |
| 5,796,849 A | 8/1998 | Coleman et al. | 381/71.8 |
| 5,954,783 A | 9/1999 | Yamaguchi et al. | 701/106 |
| 6,094,601 A | 7/2000 | Popovich | 700/28 |
| 6,415,273 B1 | 7/2002 | Fujime | 706/16 |
| 6,696,824 B1 * | 2/2004 | Johnson et al. | 323/280 |
| 6,954,054 B2 * | 10/2005 | Brown | 323/283 |
| 6,977,488 B1 | 12/2005 | Nogawa et al. | 323/271 |
| 7,148,669 B2 * | 12/2006 | Maksimovic et al. | 323/283 |

OTHER PUBLICATIONS

Canfeld, J. et al. Filtered-X CMAC: An Efficient Algorithm for Active Disturbance Cancellation in Nonlinear Dynamical Systems. Proc. of the 2003 IEEE International Symposium on Intelligent Control, Houston, Texas, Oct. 5-8, 2003, 340-345.

Hu, J. et al. Robust Adaptive Equalization Using the Filtered-X LMS Algorithm. 5th International Symposium on Signal Processing and its Applications, ISSPA '99, Brisbane, Australia, Aug. 22-25, 1999, 419-422.

(Continued)

*Primary Examiner*—Gary L Laxton
(74) *Attorney, Agent, or Firm*—Burns & Levinson LLP; Orlando Lopez

(57) ABSTRACT

Feedforward compensated systems and methods for their use in disturbance rejection in switching power converters and other systems. In one instance, a compensating component receives a sensed output and provides a duty cycle adjustment signal, the duty cycle adjustment signal being obtained from signals indicative of present and past load current variations. In another instance, an adaptive compensating component receives a sensed output and provides an adjustment signal for compensating for load variations. A compensator design component receives the digitized sensed output and of provides compensating component parameters to the adaptive compensating component; the compensator design component including a learning function.

35 Claims, 14 Drawing Sheets

Buck Power Supply with Load Current Feedforward

OTHER PUBLICATIONS

Canfield, J.C. Active Disturbance Cancellation in Nonlinear Dynamical Systems Using Neural Networks. Dissertation Submitted to the University of New Hampshire in Partial Fulfillment of the Requirements for the Degree of Doctor of Philosophy in Engineering: Electrical Dec. 2003, 1-231.

Haykin, S. Introduction to Adaptive Filters, ISBN 0-02-949460-5, pp. 41-89, pp. 108-110, and pp. 139-143.

U.S. Appl. No. 60/790,247, filed Apr. 7, 2006, Methods and Systems for Disturbance Rejection in DC-DC Converters.

* cited by examiner

METHODS AND SYSTEMS FOR DISTURBANCE REJECTION IN DC-TO-DC CONVERTERS

CROSS REFERENCE TO RELATED APPLICATIONS

This application claims priority of U.S. Provisional Application 60/790,247 entitled "METHODS AND SYSTEMS FOR DISTURBANCE REJECTION IN DC-DC CONVERTERS" filed on Apr. 7, 2006, which is incorporated by reference herein.

BACKGROUND

These teachings relates generally to method and systems for disturbance rejection in switching power converters and other systems.

An exemplary embodiment, although the present teachings are not limited to any exemplary embodiment, of the switching power converters is a buck regulator. FIG. 1 depicts the conventional feedback control of a buck regulator. The compensator is designed to provide the appropriate duty cycle command in order to achieve regulation of the output voltage around a desired set point. The compensator must be designed to achieve zero steady state error, fast transient response and loop stability. Other exemplary embodiments, these teachings not being limited only to those embodiments, include boost and flyback converters.

In some conventional forms of load feedforward disturbance rejection (for example, the form of feedforward shown in the Linear Technology LTC3401 data sheet), the load feedforward signal is generated by a microprocessor which has knowledge of changes in the load current. In some applications, the predictive signal allows for a reduction in the size of the output capacitors required for a given level of transient performance There is a need to provide improved method and systems for disturbance rejection in DC-DC converters.

Feedback is inherently limited by stability concerns. Conventional Feedforward architectures are inherently superior if the plant inversion is precise. To address this, most conventional Feedforward architectures are augmented by a feedback architecture to correct for the errors. However, precise plant inversion can be extremely difficult to achieve due to unknown plant parameters, non-linearities, or causality problems (plant delay).

There is a need for method and systems for disturbance rejection in DC-DC converters that do not require apriori knowledge of precise plant inversion.

SUMMARY

In one embodiment, the system of these teachings may include a switching power converter, a sensing component capable of providing a sensed output indicative of the load current and a compensating component capable of receiving the sensed output and of providing a duty cycle adjustment signal. In one instance, the duty cycle adjustment signal being obtained from signals indicative of present and past load current variations. In another instance, the duty cycle adjustment signal is obtained from a signal that includes information related to the load change, such as a signal that is correlated in time to the load current. The signal including information related to the load change may be a non-linear function of the load and the correlation may have substantial delay.

Various embodiments of the compensating component and adaptive compensating components are disclosed.

Methods for utilizing the system of these teachings for substantially compensating load current variations are also disclosed.

Several Potential Advantages of the Load Feedforward Technique of these teachings include:
a. For loads which are substantially accurately modeled by time varying current sinks, the load feedforward compensator of these teachings does not have the potential for instability
b. The load feedforward compensator of these teachings can be designed to provide substantially complete cancellation of load disturbances.
c. The load feedforward compensator of these teachings provides a very rapid response to sharp load current changes compared to the output voltage which provides an integration of the load step
d. A convenient algorithm exists for the on-line adaptation of the load feedforward compensator of these teachings which provides a continuous optimization of the disturbance rejection performance.

The methods and systems of these teachings for load current feedforward can be applied to systems that contain delay or right half plane zero(s). In those systems, closed loop bandwidth must be reduced to achieve stability. The methods and systems of these teachings can also be applied to control of other systems, such as, but not limited to, process control in chemical plants, robots, and aircraft systems.

BRIEF DESCRIPTION OF THE DRAWINGS

For a better understanding of the present invention, together with other and further needs thereof reference is made to the accompanying drawings and detailed description and its scope will be pointed out in the appended claims.

DETAILED DESCRIPTION OF THE INVENTION

Figure 1:
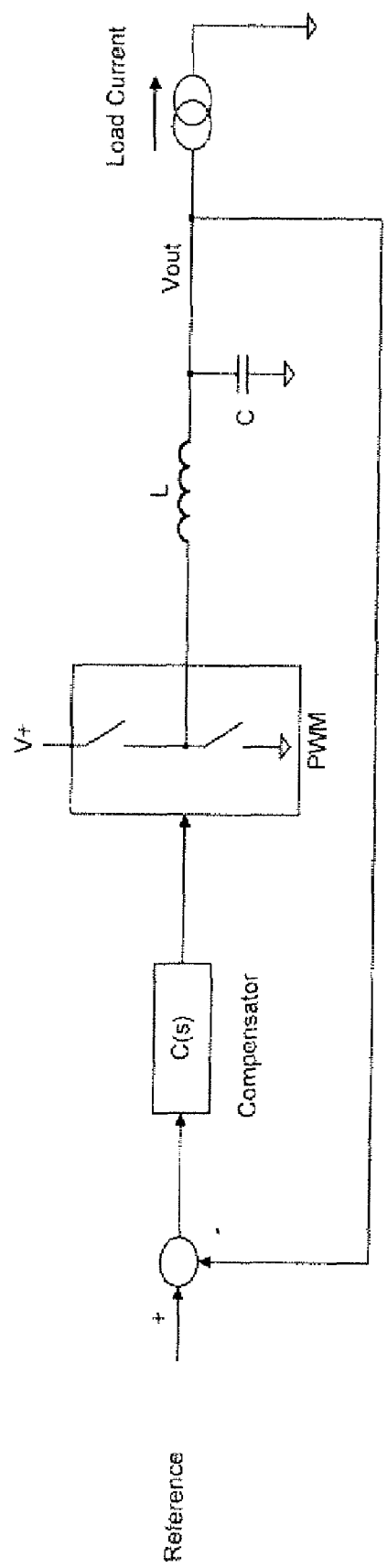
FIG. 1 is the conventional feedback control of a buck regulator.
Figure 2:
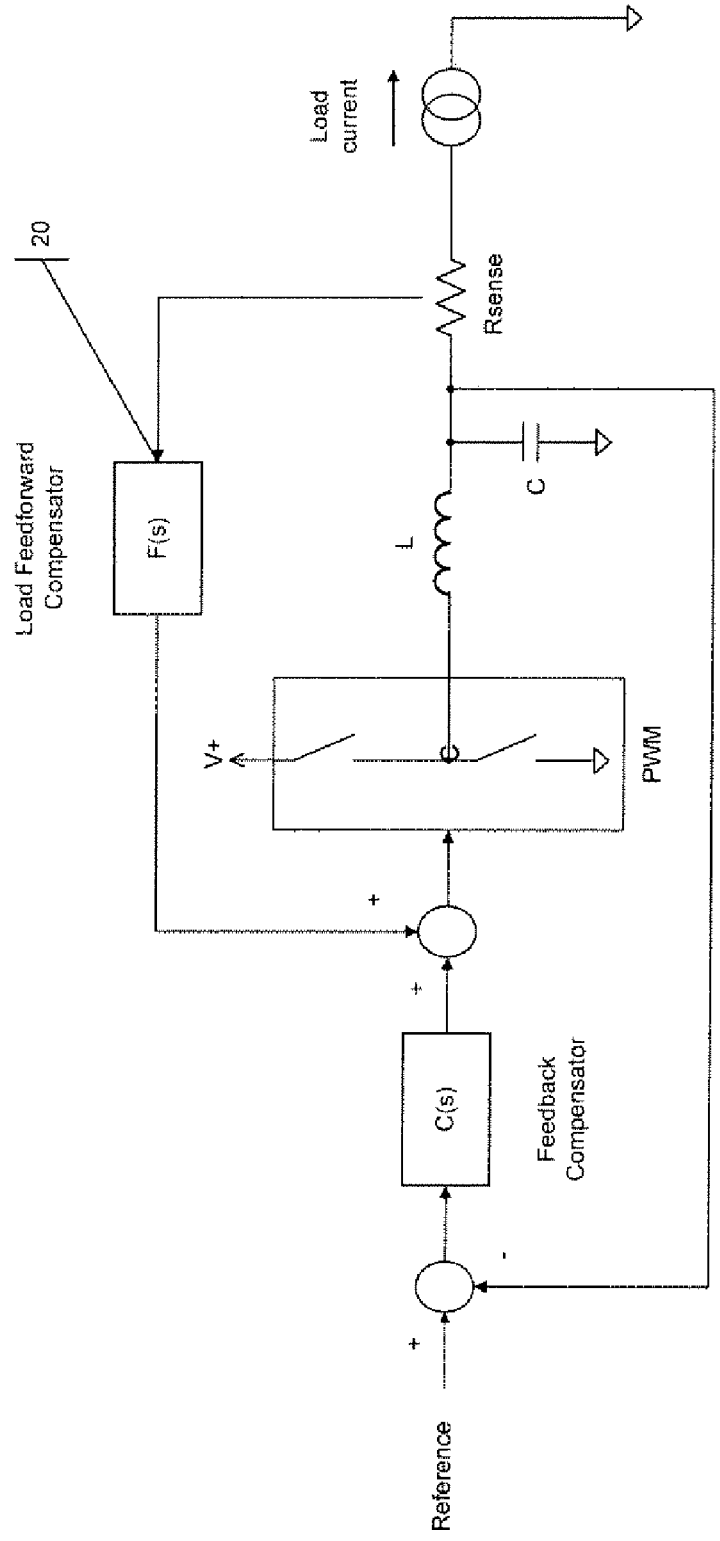
FIG. 2 shows the buck converter augmented by a load feedforward compensator, F(s)

FIG. 2 shows an exemplary switching power converter, the buck converter, augmented by a load feedforward compensator, F(s), where s is the Laplace transform variable. It should be noted that the system and methods of these teachings are not limited to the exemplary switching converter. It should also be noted that, although the system shown in FIG. 2 is described in terms of a continuous time system (in terms of the Laplace transform variable), these teachings also apply to discrete time systems (represented in terms of the z transform variable, as disclosed herein below). The load feedforward compensator 20 monitors the load current and provides an appropriate adjustment to the duty cycle to compensate directly for load variations. When the load can be represented as a time varying current sink, there is substantially no coupling between the duty cycle and the load current. As a result, there is substantially no significant likelihood of instability due to the load feedforward compensator.

Figure 3:
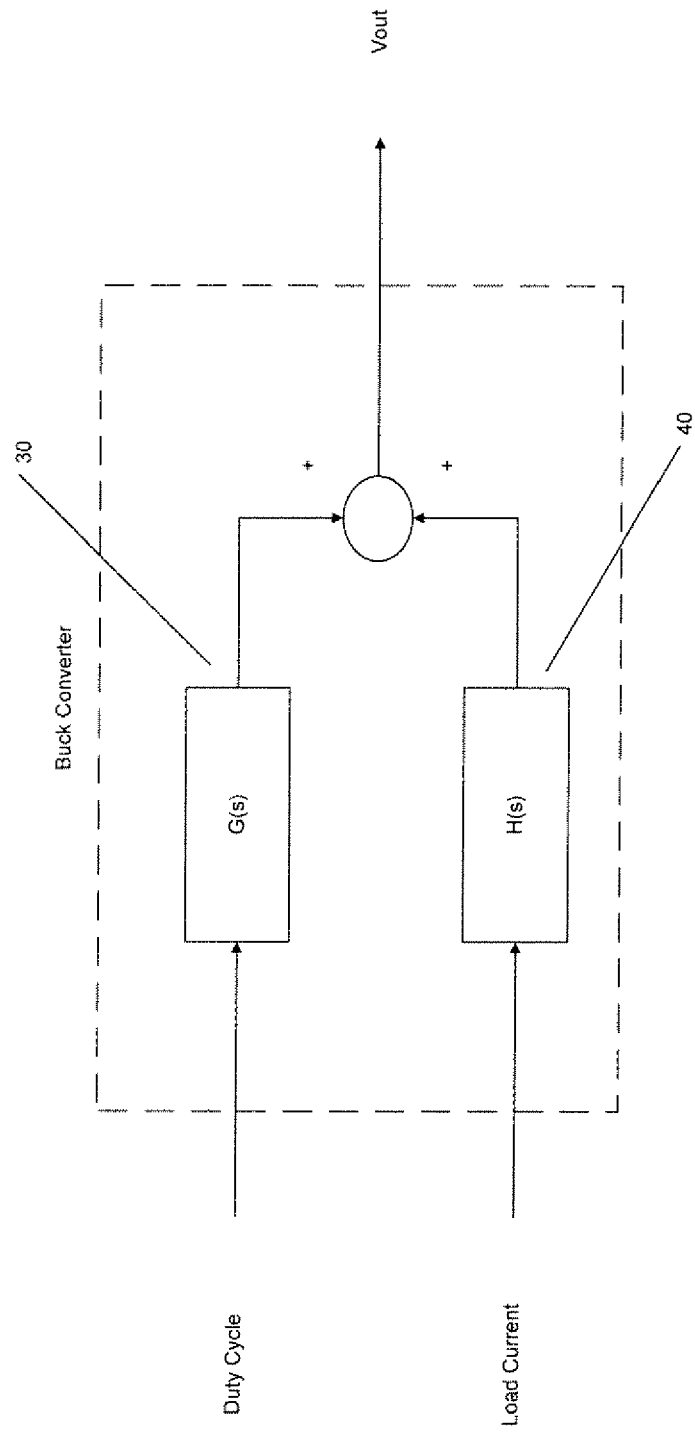
FIG. 3 depicts a schematic block diagram representation of an alternative conceptual view of the buck converter in its linear operational mode.

FIG. 3 depicts an alternative conceptual view of a switching power converter, such as the buck converter, in its linear operational mode. This conceptual view does not limit these teachings. The system is represented by two independent transfer functions. G(s) 30 represents the effect of the duty cycle on the output voltage while H(s) 40 represents the effect of load current variations on the output voltage. The load current can be represented as an independent exogenous input to the system.

For a buck converter, the two independent transfer functions are given by $$G(s) = Vdd \frac{C\,Rc\,s + 1}{L\,C\,Rc\,s^2 + C(Rc + Rl)s + 1}$$

$$H(s) = -\frac{L\,C\,Rc\,s^2 + (L + C\,Rc\,Rl)s + Rl}{L\,C\,Rc\,s^2 + C(Rc + Rl)s + 1}$$

Figure 4:
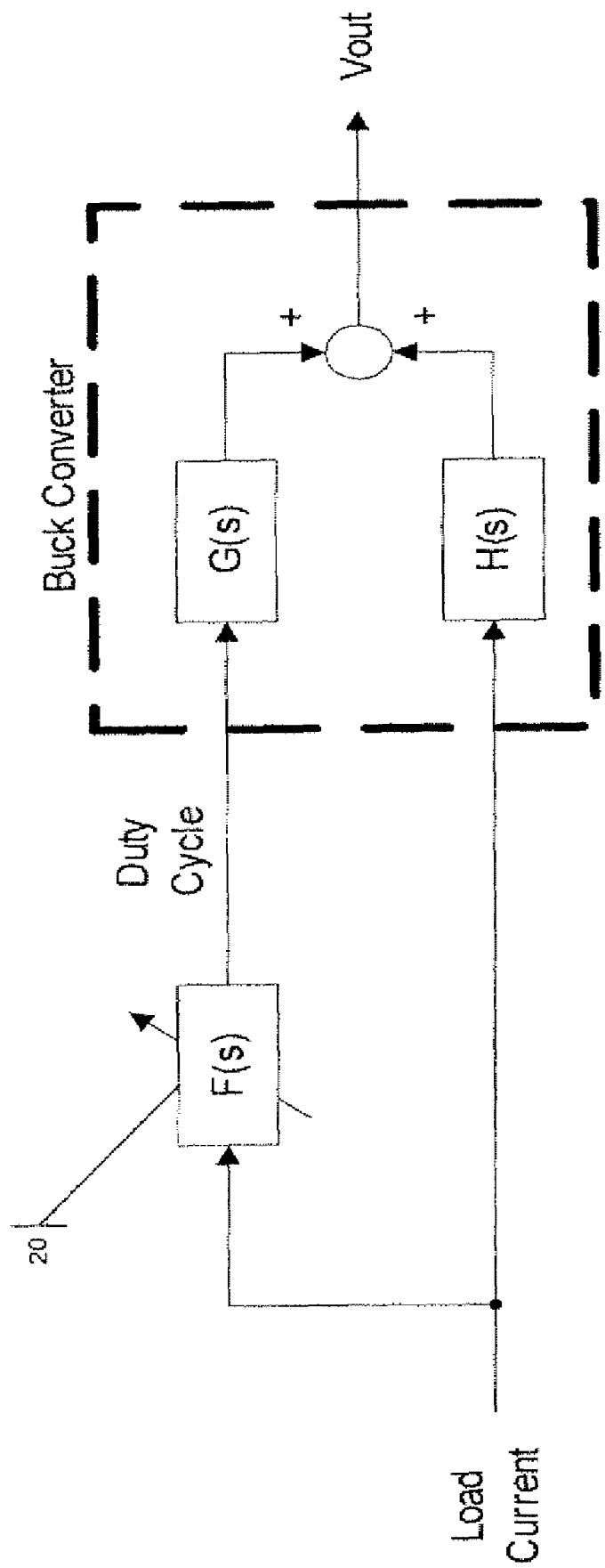
FIG. 4 shows a schematic block diagram representation of an embodiment of the system of these teachings.

Where: L is inductor inductance
C is output capacitance
Rc is output cap ESR
Rl is inductor ESR+switch resistance
Vdd is supply voltage FIG. 4 shows an embodiment of the load feedforward compensator of these teachings 20, F(s), with the conceptual switching power converter model. The compensator uses a measure of the load current to create an appropriate response in the duty cycle in order to reduce the disturbance in the output voltage. The output of the load feedforward compensator 20 is a function of the past history of the load current. (In the instance in which F(s) is express as a function of a Laplace transform variable, multiplying the measure of the load current, also expressed in terms of Laplace transform variable) by F(s) is the same as performing a convolution in the time domain.) Should G(s) inverse, he non-casual, F(s) can be approximated by allowing F(s)*G(s)=exp(−s*T), where T is a delay chosen to make F(s) stable.

Figure 5:
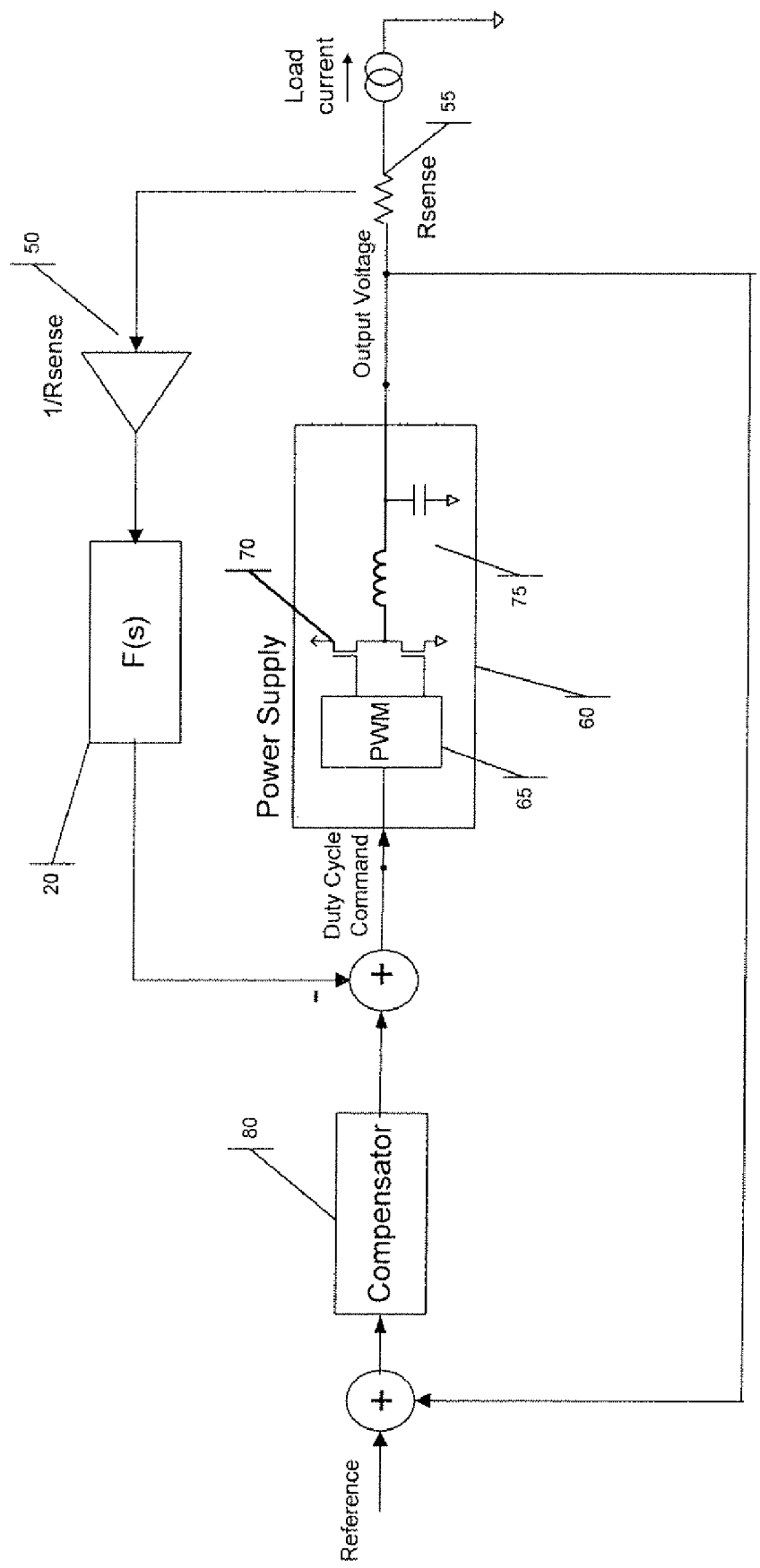
FIG. 5 depicts a schematic block diagram representation of another embodiment of the system of these teachings.

In one embodiment, shown in FIG. 5, the system of these teachings includes a switching power converter 60, a sensing component (comprised, in the embodiment shown in FIG. 5, of a small resistor 55 and an amplifier 50) capable of providing a sensed output indicative of the load current and a compensating component 20 capable of receiving the sensed output and of providing a duty cycle adjustment signal. The switching power converter 60 includes a circuit 75 comprising at least two reactive components configured to provide an output voltage and capable of being switched from one output voltage state to another output voltage state and providing a load current to a load, a switching component 70 capable of switching the circuit between the one output voltage state and the another output voltage state, and a driver component 65 capable of receiving an input control signal comprising a duty cycle signal and of driving the switching component in order to cause switching between the one output voltage state and the another output voltage state in response to set input control signal. In one instance, the compensating component 20 is capable of receiving the sensed output and of providing a duty cycle adjustment signal, the duty cycle adjustment signal being combined with a duty cycle signal from a feedback controller. In one instance, the duty cycle adjustment signal is obtained from signals indicative of present and past load current variations.

In one embodiment of the system of these teachings, the compensating component 20 is a digital compensating component. In that embodiment, the system of these teachings includes an analog to digital converter capable of receiving the sensed output and of providing a digitized sensed output to the compensating component 20.

In another embodiment of the system of these teachings, the compensating component 20 transfer function comprises a ratio of polynomials, each polynomial in said ratio of two polynomials being a polynomial in a transform variable. In one instance, the compensating component 20 is substantially an inverse model of the switching converter 60. For the buck converter exemplary embodiment, in one instance, the compensating component 20 is given by $$F(s) = \frac{H(s)}{G(s)}$$

$$= \frac{-\dfrac{L\,C\,Rc\,s^2 + (L + C\,Rc\,Rl)s + Rl}{L\,C\,Rc\,s^2 + C(Rc + Rl)s + 1}}{Vdd \dfrac{C\,Rc\,s + 1}{L\,C\,Rc\,s^2 + C(Rc + Rl)s + 1}}$$

$$= -\frac{L\,C\,Rc\,s^2 + (L + C\,Rc\,Rl)s + Rl}{Vdd(C\,Rc\,s + 1)}$$

where s is the Laplace transform variable (the compensator component transfer function could also be expressed in terms of the frequency by expressing the transfer function in terms of the Fourier transform variable, which is proportional to the frequency or a 1/z transform variable which is related to a delay; the 1/z transform variable, also referred to as the z transform variable, is used in discrete systems).

In one instance, if G(s)=N1(s)/D1(s) and H(s)=N2(s)/D2(s), then the optimal compensator is simply F(s)=−N1(s)/N2(s). In the substantially linear model, this compensator provides substantially complete cancellation of load disturbances. This result provides an estimate of the required order of the feedforward compensator. In some embodiments, the feedforward compensation of these teachings could be implemented in fixed (analog or digital) hardware if the system is sufficiently time invariant.

In embodiments in which the compensating component 20 is a digital compensating component, the compensating component transfer function is expressed in terms of the z transform and the compensating component may be an FIR filter.

Figure 6A:
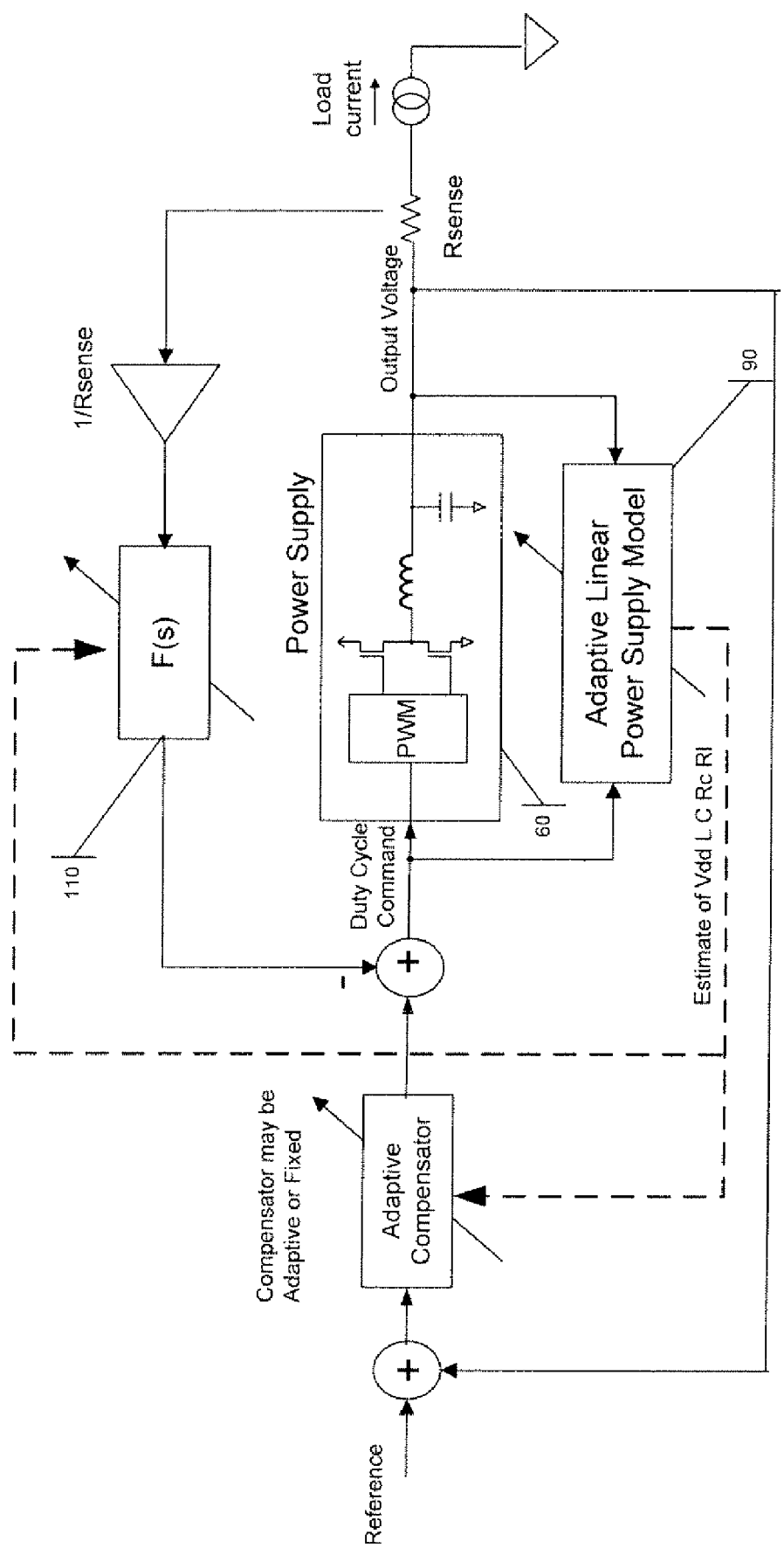
FIG. 6a shows a schematic block diagram representation of an embodiment of the system of these teachings including an adaptive load feedforward compensator.

In one instance, the compensator component 20 is an adaptive compensating component, allowing for variations in the switching power converter and the switching power converter transfer function. The adaptive compensating component does not have to be necessarily digital but, in most instances, the adaptive compensating component is a digital adaptive compensating component. One embodiment of a system of these teachings including an adaptive compensating component is shown in FIG. 6a. Referring to FIG. 6a, the embodiment shown therein includes a compensator design component 90 capable of receiving a switching power converter output and a switching power converter input and of providing compensating component parameters (L, C, Rc and Ri, for example, in one instance) to the adaptive compensating component 110.

Figure 6B:
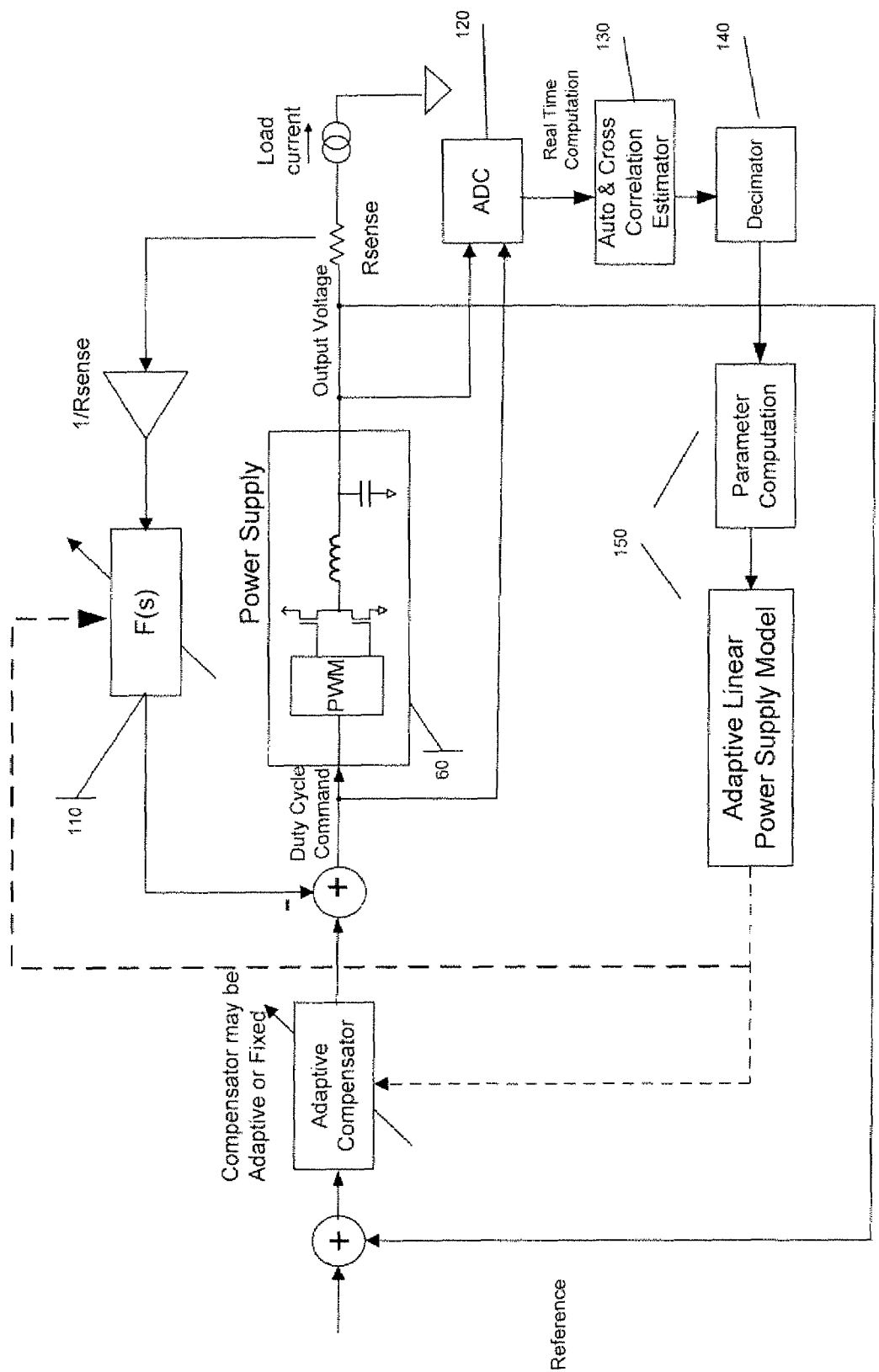
FIG. 6b shows a schematic block diagram representation of another embodiment of the system of these teachings including an adaptive load feedforward compensator.

In one embodiment, the sensing component includes a load current estimator. The load current estimator receives the output signal (output voltage) and state estimation data from the compensator design component 90 and using a system (power supply) model, obtained from the compensator design component 90, provides an estimate of the load current data. In some embodiments, the load current estimator utilizes the LMS algorithm in order to provide an estimate of the load current data. (For a description of the LMS algorithm, see, for example, S. Haykin, *Introduction to Adaptive Filters*, ISBN 0-02-949460-5, pp. 108-110.). In other embodiments, the load current estimator utilizes an RLS algorithm (for a description of the RLS algorithm, see, for example, S. Haykin, *Introduction to Adaptive Filters*, ISBN 0-02-949460-5, pp. 139-143). In another embodiment, as described in the U.S. Patent Application Publication corresponding to U.S. patent application Ser. No. 11/553,917, both of which are incorporated by reference herein, the load current estimator is capable of receiving the output signal sampled at a first sampling rate and state estimation data from the adaptive plant estimator component 90 and of providing estimated load current data at the first sampling rate (in a manner similar to that shown in FIG. 6b). In one instance, another decimator component is capable of receiving the estimated load current data at the first sampling rate and of providing estimated load current data at a predetermined operating rate FIG. 6b shows a block diagram representation of another embodiment of the system of these teachings. Referring to FIG. 6b, the embodiment shown therein includes a sampling component 120 that samples an output signal from a system 60 and an input signal from the system 60 at a first sampling rate, the first sampling rate being greater than or equal to a predetermined operating rate, an input parameter obtaining component 130 capable of receiving the output signal and the input signal sampled at the first sampling rate and of obtaining values for a number of input parameters, the values for the input parameters being sampled at the first sampling rate, a decimator component 140 capable of receiving the values for the input parameters sampled at the first sampling rate and of providing subsampled values for the input parameters, the subsampled values being sampled at a second sampling rate, the second sampling rate been slower than the first sampling rate, an adaptive plant estimator (system design) component 150 that receives the subsampled values of the input parameters and obtains a model of the system 60. Embodiments that operate at one sampling rate, in which a decimator component is not utilized, are also within the scope of these teachings.

In one instance, the parameter obtaining component 130 is an autocorrelation and crosscorrelation estimator. In one embodiment, the sampling component 120 is an oversampling modulator; and the first sampling rate is an oversampled rate. An exemplary embodiment of an oversampling modulator is a Sigma Delta modulator.

In one embodiment, the load feedforward compensator of these teachings includes a compensator design component capable of receiving a switching power converter output and a switching power converter input and of providing compensating component parameters to the adaptive compensating component. In one embodiment, the adaptive compensating component is an FIR filter expressed as a polynomial in the z-transform variable. In one instance, the compensator design component utilizes an LMS algorithm. In another instance, the compensator design component utilizes an RLS algorithm. In some instances, the adaptation algorithm must adjust the compensator transfer function in a manner which reduces the disturbances seen in the output voltage. An algorithm for achieving this has been proposed for control and active disturbance cancellation uses. It is usually referred to as the Filtered-X LMS Algorithm.

While not desire and to be bound by theory, one comparison of the LMS algorithm and the Filtered-X LMS Algorithm is given in Table 1 below.

TABLE 1

| Standard LMS Algorithm | | |
|---|---|---|
| Filter Equation | Error Equation | Weight Update Equation |
| $y_k = \sum_{i=0}^{N} w_r x_{k-i}$ | $e_k = d_k - \sum_{i=0}^{N} w_r x_{k-i}$ | $W_{k+1} = W_k + u\, e_k X_k$ |

Where:
x is filter input
y is filter output
W tap gain or weight vector
d is desired filter output
e is filter error
u is update gain

| Filtered-X LMS Algorithm | | | |
|---|---|---|---|
| Filter Equation | Input Filter Equation | Error Equation | Weight Update Equation |
| $y_k = \sum_{i=0}^{N} w_r x_{k-i}$ | $o_k = \sum_{i=0}^{N} g_r x_{k-i}$ | $e_k = d_k - \sum_{i=0}^{N} w_r o_{k-i}$ | $W_{k+1} = W_k + u\, e_k O_k$ |

Figure 7:
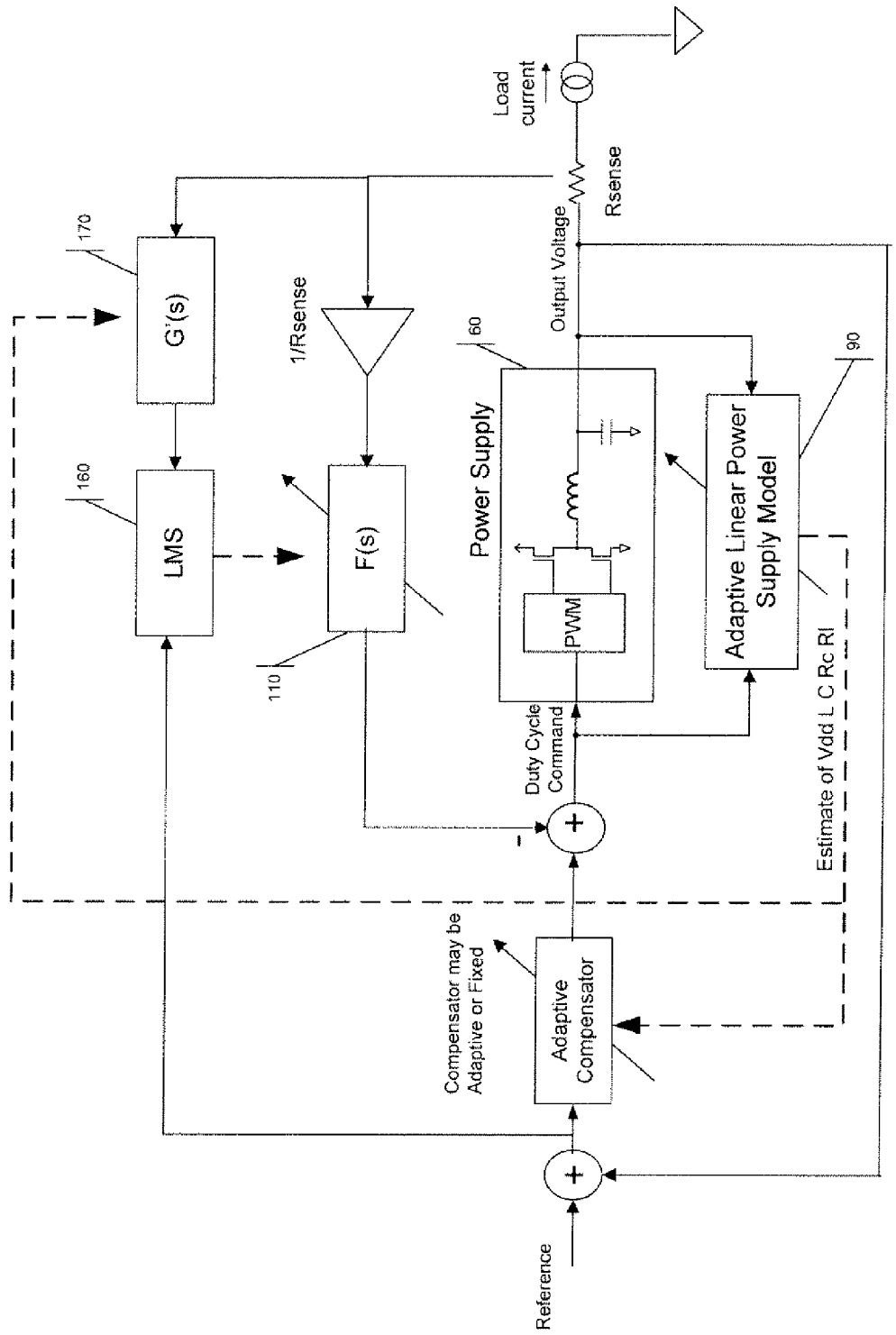
FIG. 7 depicts a schematic block diagram representation of an embodiment of the system of these teachings including the Filtered-X Least Mean Square (LMS) algorithm applied to the load feedforward compensator.

Where:
x is filter input
o is prefilter output
G is prefilter impulse response vector
y is filter output
W tap gain or weight vector
d is desired filter output
e is filter error
u is update gain FIG. 7 depicts an embodiment of the system of these teachings were the Filtered-X Least Mean Square (LMS) algorithm is applied to the load feedforward compensator of these teachings. The embodiment shown in FIG. 7 includes a filter component 170 (G'(s) in FIG. 7), the filter component comprising an estimate of a duty cycle to output voltage transfer function for the switching power converter, and a compensator design component capable of receiving the filtered sensed output from the filter component and a digitized input signal for the switching power converter and of providing compensating component parameters to the adaptive compensating component. In one embodiment, the compensator design component 160 is an LMS component. The LMS block represents the coefficient update algorithm where in a conventional application its inputs are the filter input and the filter error. In this case, its inputs are a filtered version of the load current and the output voltage error. The input filtering is performed with G'(s) which represents a model of the actual duty cycle to output voltage transfer function G(s). The filter (plant estimate) G'(s) is obtained through a system identification (ID) step, is obtained either at startup or in an on-line fashion. In the embodiment shown in FIG. 7, the plant estimate is obtained by the system design component 90, which provides an estimate of the parameters of the fitter G'(s).

As in FIG. 6b, embodiments can include a sampling component 120 that samples an output signal from a system 60 and an input signal from the system 60 at a first sampling rate, the first sampling rate being greater than or equal to a predetermined operating rate, an input parameter obtaining component 130 capable of receiving the output signal and the input signal sampled at the first sampling rate and of obtaining values for a number of input parameters, the values for the input parameters being sampled at the first sampling rate, a decimator component 140 capable of receiving the values for the input parameters sampled at the first sampling rate and of providing subsampled values for the input parameters, the subsampled values being sampled at a second sampling rate, the second sampling rate been slower than the first sampling rate, an adaptive system design component 150 that receives the subsampled values of the input parameters and obtains a model of the system 60 and provides an estimate of the parameters of the filter G'(s). Embodiments that operate at one sampling rate, in which a decimator component is not utilized, are also within the scope of these teachings.

It should be noted that if the filter component 170 is absent, in which case the compensator design component is capable of receiving the sensed output and a digitized input signal (in the embodiment shown in FIG. 7, the compensator design component would receive a signal indicative of the load current and the output voltage error), the compensator design component 160 provides compensator component parameters to the adaptive compensating component. In one embodiment, the compensator design component 160 is an LMS component. In another embodiment, the compensator design component 160 is an RLS component.

Figure 8A:
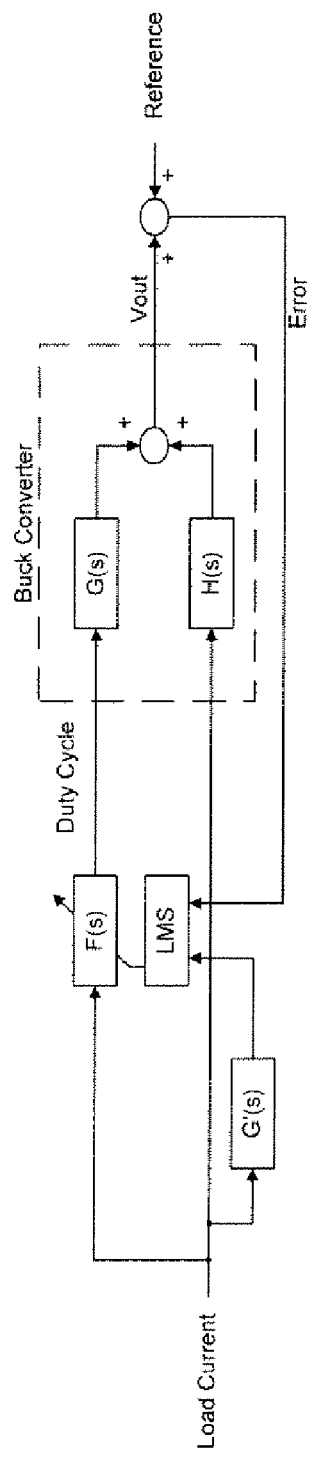
FIGS. 8a, 8b, 8c show schematic block diagram representations of an implementation of an embodiment of the system of these teachings including the Filtered-N Least Mean Square (LMS) algorithm applied to the load feedforward compensator.
Figure 8C:
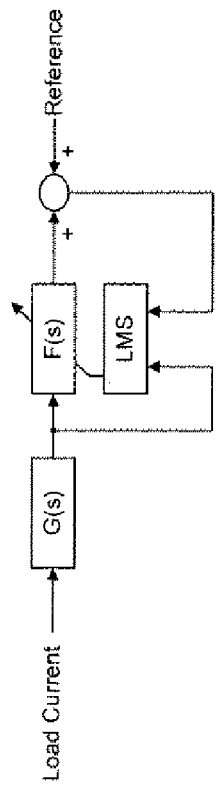
Figure 8B:
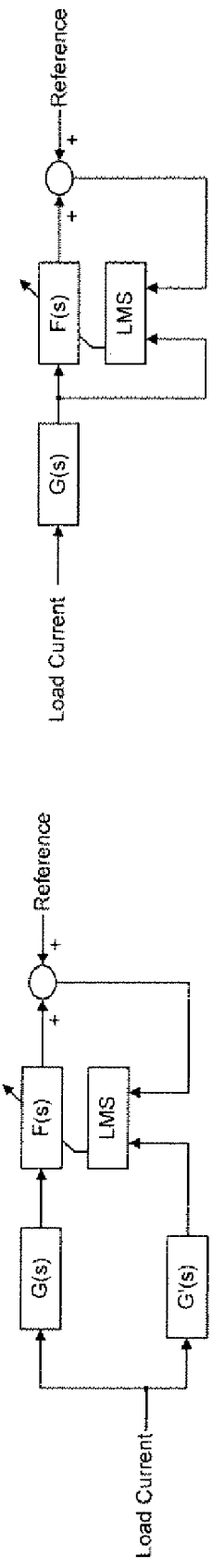

FIGS. 8a, 8b, 8c provide a qualitative explanation for the operation of the Filtered-X LMS algorithm. (Not desiring to be bound by theory, this explanation is not a limitation of these teachings.) FIG. 8a shows the load feedforward compensator, F(s), with the conceptual buck converter model. The compensator uses a measure of the load current to create an appropriate response in the duty cycle in order to reduce the disturbance in the output voltage. Conventional adaptive filter techniques are based on a reduction in the error in the filter output. However, in this case, the error in the compensator output is unknown. Instead, the adaptation algorithm must adjust the compensator transfer function in a manner which reduces the disturbances seen in the output voltage. The Filtered-X LMS Algorithm adjusts the compensator transfer function in a manner which reduces the disturbances seen in the output voltage.

Consider the block diagram of FIG. 8a. When the compensator coefficients are slowly varying, it can be considered to be linear and therefore a commutation of blocks F(s) and G(s) can be performed (Note that when G'(s) and F(s) are modeled in discrete time, G'(s) and F(s) are represented as G'(z) and F(z)). F(z) maybe be a FIR filter). The resultant system is shown in FIG. 8b below where the load current path has been eliminated for simplicity. Then, under the assumption that G'(s) is a substantially complete model of G(s), the system can be depicted as shown in FIG. 8c. The form of the system shown in FIG. 8c represents the standard use of the LMS adaptive filter update algorithm.

Figure 9:
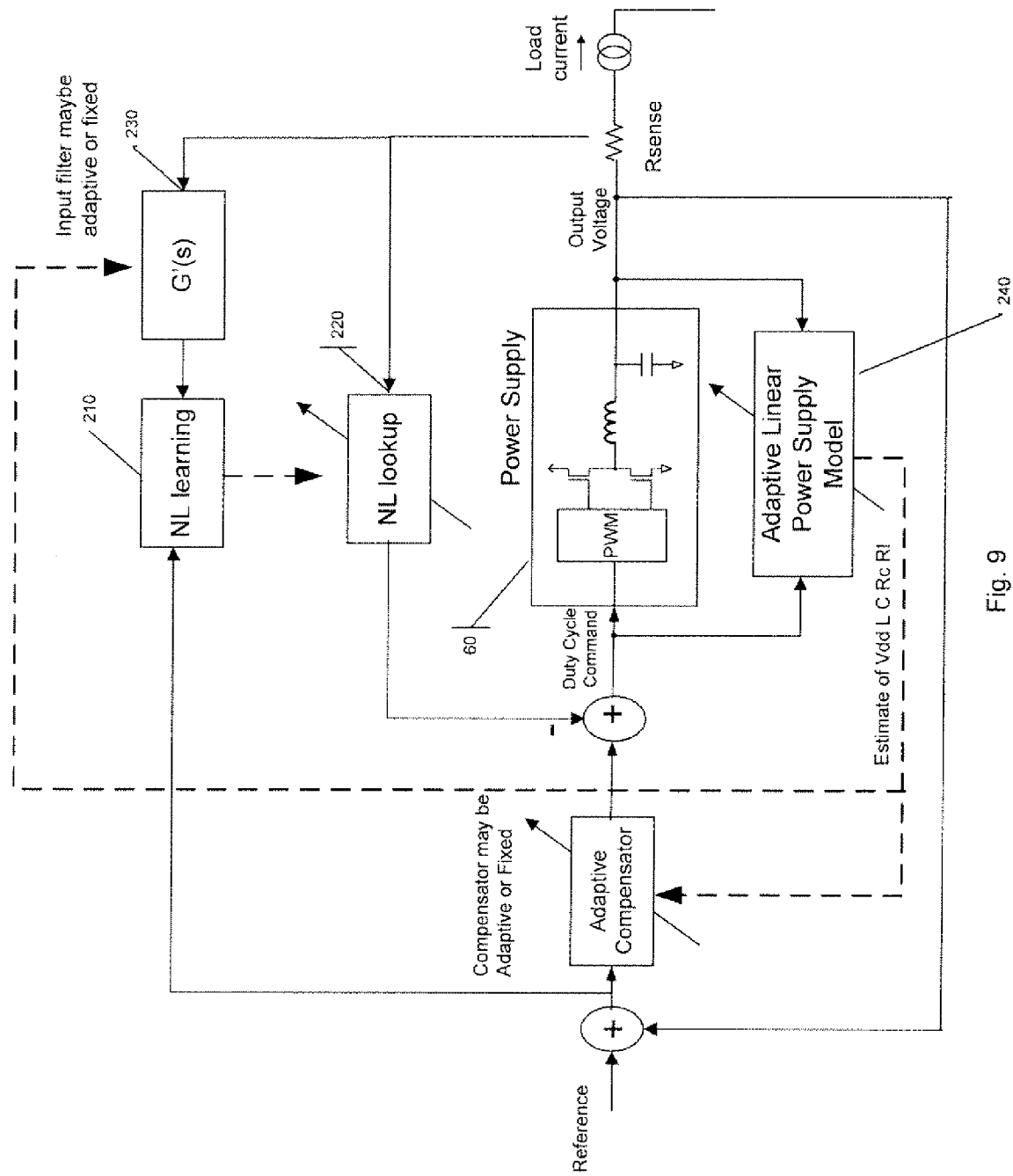
FIG. 9 depicts a schematic block diagram representation of yet another embodiment of the system of these teachings.
Figure 11:
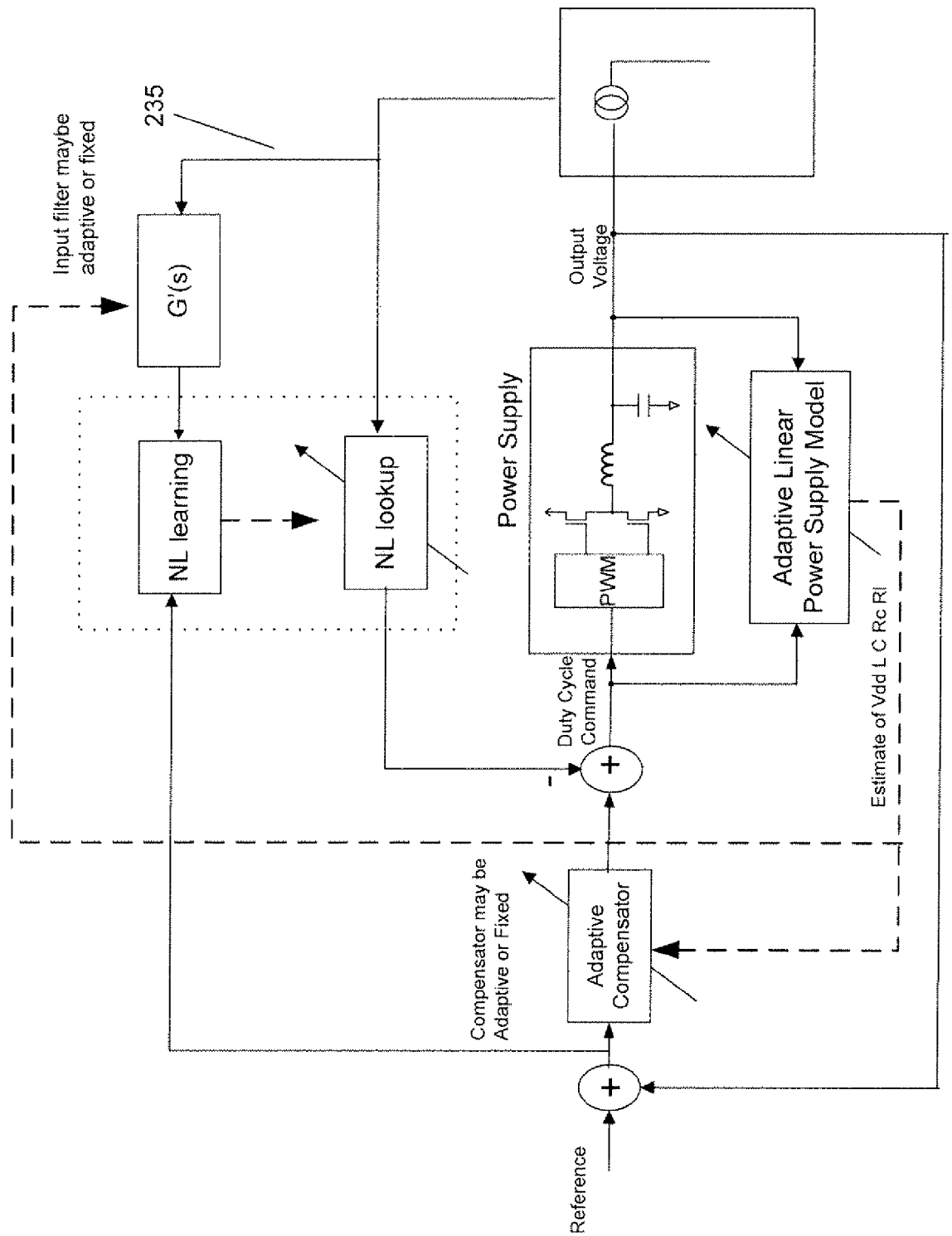
FIG. 11 depicts a schematic block diagram representation of an embodiment of the system of these teachings having as sensed output a correlated trigger signal.

In some instances, the nonlinearities in the system and/or in the sensing of the output indicative of the load current are significant and the compensating component has to be capable of representing the nonlinearities. One embodiment of a feedforward compensated switching power converter capable of representing nonlinearities in the system is shown in FIG. 9. Referring to FIG. 9, the embodiment of the system shown therein includes a compensator design component 210 capable of receiving the digitized sensed output and of providing compensating component parameters to the adaptive compensating component 220; said compensator design component comprising a learning function; the learning function being trained in order to provide the compensating component parameters. In one instance, adaptive compensating component 210 comprises a non-linear lookup function. In one embodiment, the adaptive compensating component 220 and the compensator design component 210 are incorporated in a component capable of learning/being trained. In one exemplary embodiment, the adaptive compensating component 220 and the compensator design component 210 are both incorporated into a cerebellar model arithmetic computer (CMAC), as shown in FIG. 11. Embodiments in which only the compensator design component 210 includes a cerebellar model arithmetic computer (CMAC) are also within the scope of these teachings. It should be noted that when a CMAC is utilized, since the CMAC does not have memory, delay line inputs are utilized in order to include the affect of past inputs (see, for example, Canfield, J.; Kraft, L. G.; Latham, P.; Kun, A, Filtered-X CMAC: an efficient algorithm for active disturbance cancellation in nonlinear dynamical systems, 2003 IEEE International Symposium on Intelligent Control, 2003, Pages 340-345, which is incorporated by reference herein).

In the embodiment shown in FIG. 9, the feedforward compensated switching power converter also includes a filter component 230 receiving the sensed output signal, where the filter component 230 comprises an estimate of a duty cycle to output voltage transfer function for the switching power converter, the compensator design component 210 receiving the output of the filter component 230. The filter component 230, G'(s), may be adaptive or fixed. The filter component 230, G'(s), shown in FIG. 9 is adaptive. A system design component 240 receives an output and an input signal from the switching power converter and of provides filter component parameters. (The embodiment shown in FIG. 9 may be referred to as a Filtered-x non-linear algorithm in analogy to the Filtered-x LMS algorithm.)

Figure 10:
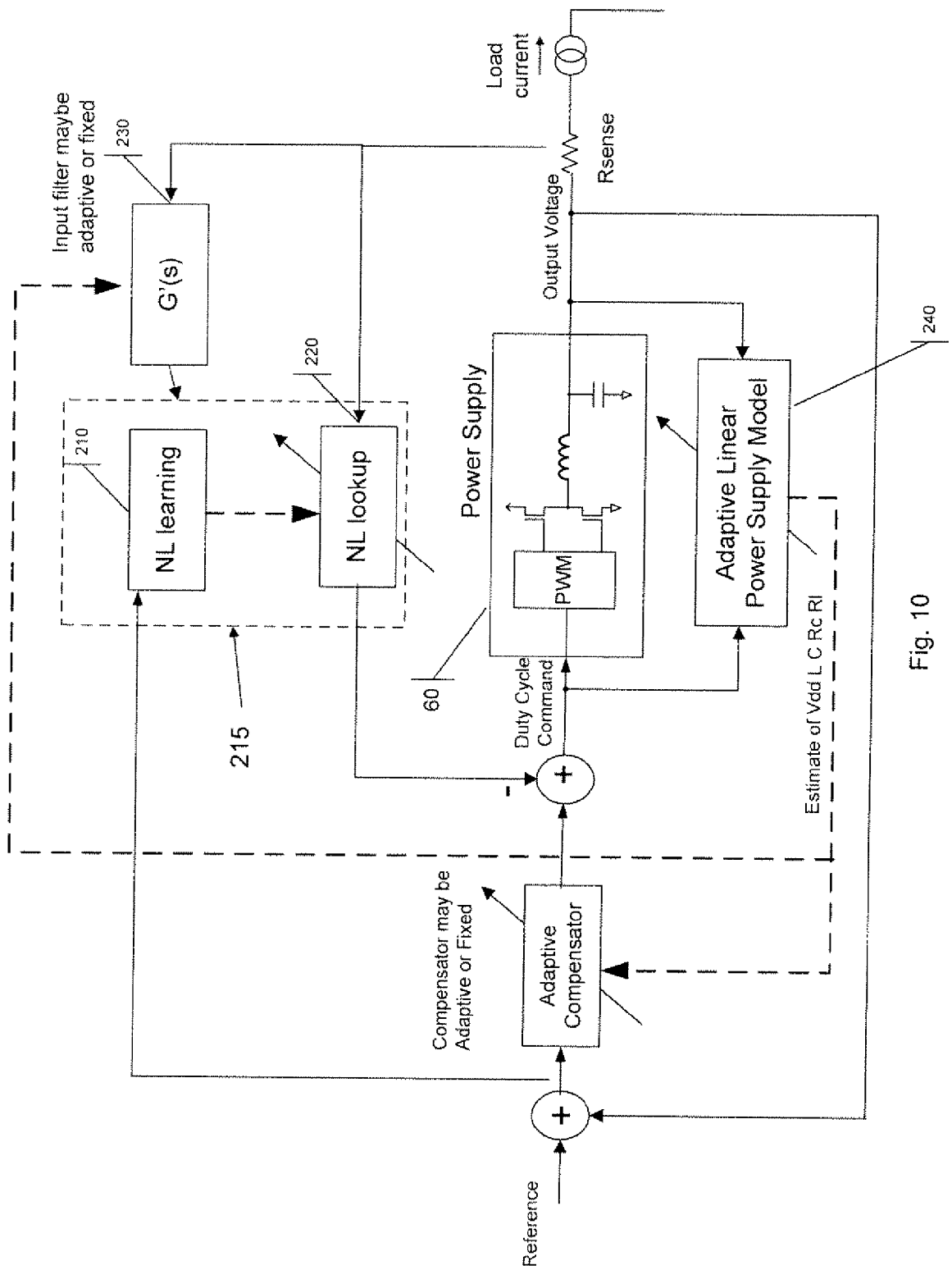
FIG. 10 depicts a schematic block diagram representation of still another embodiment of the system of these teachings.

In the embodiment shown in FIG. 10, the adaptive compensating component 220 and the compensator design component 210 are incorporated in a component 215 capable of learning/being trained.

In the embodiment shown in FIGS. 9-11, as in FIG. 6b, the embodiments can include a sampling component 120 that samples an output signal from a system 60 and an input signal from the system 60 at a first sampling rate, the first sampling rate being greater than or equal to a predetermined operating rate, an input parameter obtaining component 130 capable of receiving the output signal and the input signal sampled at the first sampling rate and of obtaining values for a number of input parameters, the values for the input parameters being sampled at the first sampling rate, a decimator component 140 capable of receiving the values for the input parameters sampled at the first sampling rate and of providing subsampled values for the input parameters, the subsampled values being sampled at a second sampling rate, the second sampling rate been slower than the first sampling rate, an adaptive system design component 240 that receives the subsampled values of the input parameters and obtains a model of the system 60 and provides an estimate of the parameters of the filter G'(s). Embodiments that operate at one sampling rate, in which a decimator component is not utilized, are also within the scope of these teachings.

Although in the embodiments described above, the sensed output signal indicative of the load current is obtained from a physical effect (a voltage drop across a resistance in the figures described above), a variety of other signals are possible and within the scope of these teachings. In some instances, a trigger or monitor signal from the load may be supplied to the NL algorithm as the signal indicative of load current. The trigger or monitor signal can be such that a up coming change in load current is predicted from the load. One exemplary embodiment, these teachings not being limited to only that embodiment, is a signal indicative of a processor entering and leaving sleep mode. Shown in FIG. 11 is a feedforward compensated switching power converter in which the sensed output signal is a correlated trigger signal 235. Although not explicitly shown, the filter component G'(s) in this embodiment may include components that translate the correlated trigger signal into a load current (similar in function to the 1/R sense amplifier in FIG. 9). It should also be noted that the learning function in the FIGS. 9-11 may include initial training and subsequent training or adaptation (also referred to as updating of the weights).

Although not desiring to be bound by theory, a typical nonlinear algorithm and a filtered-ex nonlinear algorithm are given in Table 2 below.

TABLE 2

| Standard Non-Linear Algorithm | | |
|---|---|---|
| Filter Equation | Error Equation | Weight Update Equation |
| $y_k = \sum_{i=0}^{N} W_i f_i(X)$ | $e_k = d_k - \sum_{i=0}^{N} W_i f_i(X)$ | $W_{k+1} = W_k + u\, e_k f_k(X)$ |

Where:
X is filter input Vector
y is filter output
W tap gain or weight vector
f Non-linear lookup function
d is desired filter output
e is filter error
u is update gain

| Filtered-X Non-Linear Algorithm | | | |
|---|---|---|---|
| Filter Equation | Input Filter Equation | Error Equation | Weight Update Equation |

TABLE 2-continued

| | | | |
|---|---|---|---|
| $y_k = \sum_{i=0}^{N} W_i f_i(X)$ | $o_k = \sum_{i=0}^{N} g_i x_{k-i}$ | $e_k = d_k - \sum_{i=0}^{N} W_i f_i(O)$ | $W_{k+1} = W_k + u\, e_k f_k(O)$ |

Figure 12:
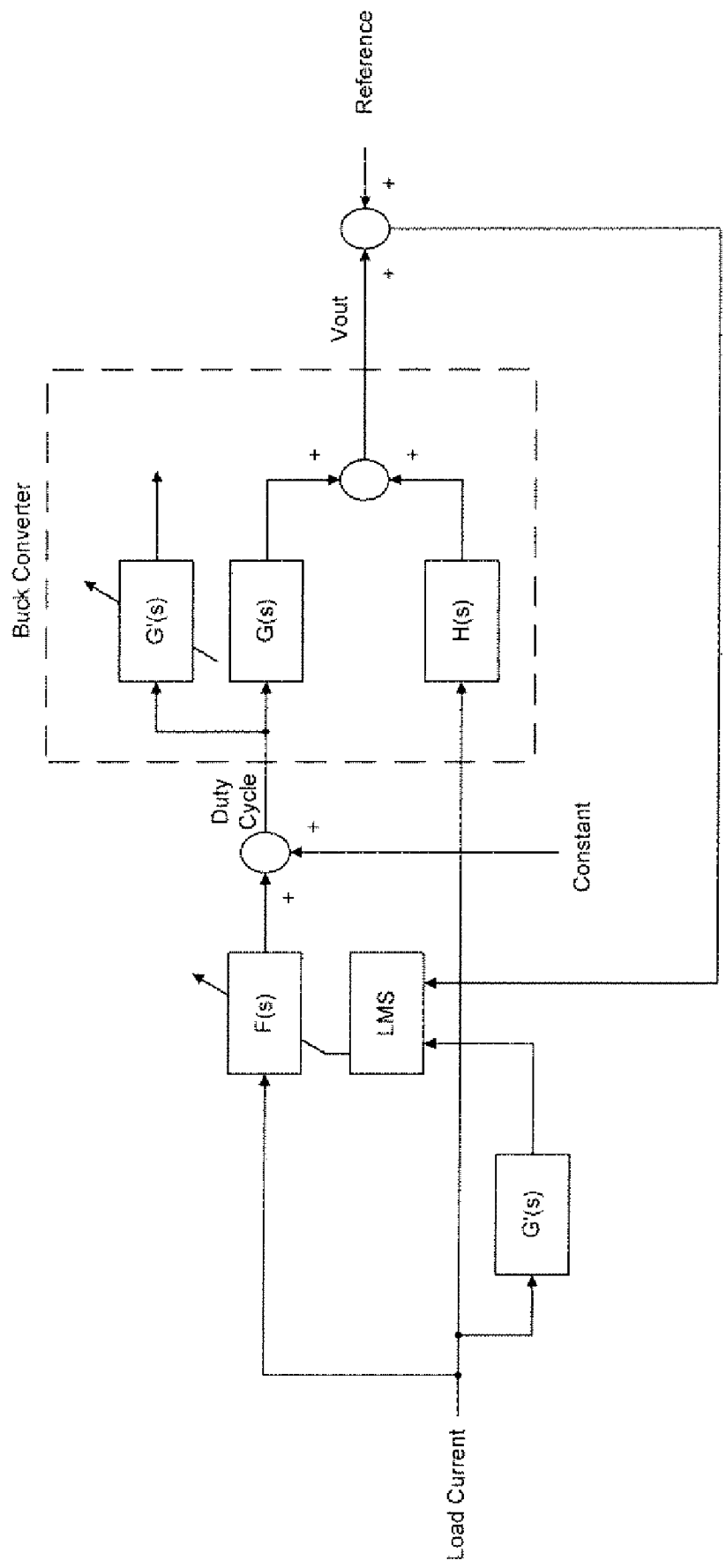
FIG. 12 represents a block diagram of an embodiment of the system of these teachings implemented in order to perform laboratory demonstrations.
Figure 13:
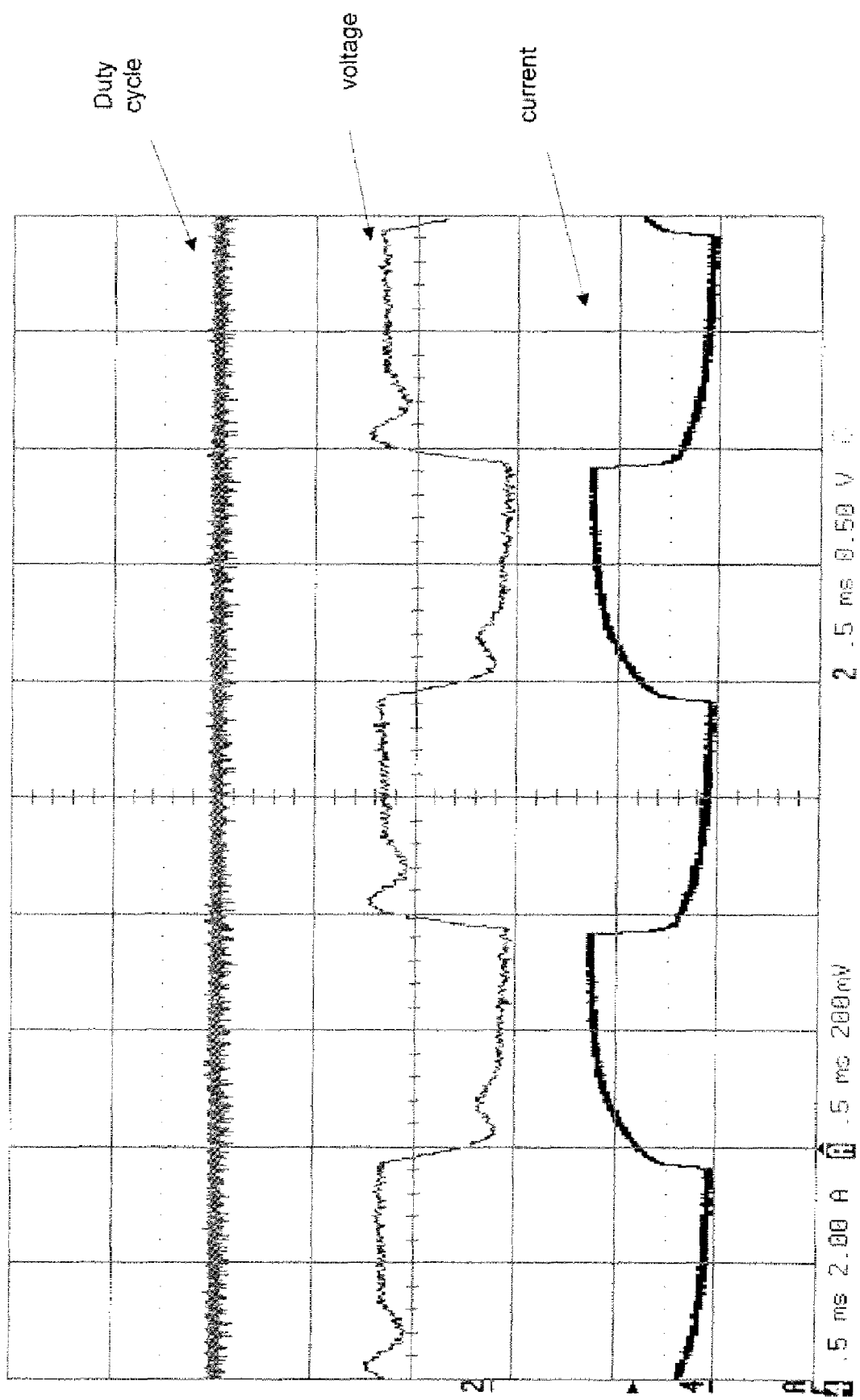
FIG. 13 represents results for an implementation of the embodiment of the load feedforward compensator shown in FIG. 12.

Where:
X is filter input vector
o is prefilter output
G is prefilter impulse response vector
y is filter output
W tap gain or weight vector
f Non-linear lookup function
d is desired filter output
e is filter error
u is update gain In order to better illustrate these teachings, an implementation of an exemplary embodiment is described herein below. It should be noted that these teachings are not limited to the exemplary embodiment. The Filtered-x LMS algorithm disclosed hereinabove as shown in FIG. 7 was implemented. The controller runs on a T1 C6711 DSP (150 Mhz, VL1W architecture) while the PWM and Delta-Sigma ADCs are implemented in a Virtex-E FPGA. Two high speed serial buses are used for communication between the DSP and FPGA. For the results shown in FIG. 13, the feedback compensator is disabled in order to show the effect of the load feedforward compensator in isolation. In the results shown in FIG. 13, the load current is subjected to a 2.25 amp step increase. In the graphical representation of the results, shown in FIG. 13, the timescale is 0.5 ms/division, the voltage scale is 200 mV/div and the load current scale is 2 A/div. The block diagram of the implemented embodiment is shown in FIG. 12.

As noted herein above, in addition to utilizing a direct measure of the load current, the load feedforward approach of these teachings can be used with a microprocessor output which predicts impending load current variations. The adaptive compensator of these teachings in this embodiment allows an arbitrary time delay between the predictive signal and the actual load step, when, for example, the predictive signal is substantially linearly related to the actual load current.

Although to illustrate the systems of these teachings, the buck converter topology was used, it should be noted that these teachings are not limited only to that converter topology. The methods and systems of these teachings are general applicable to any topology-for example, buck, boost, buck-boost forward fly-back to SEPIC. The adaptive structure of these teachings has general applicability.

It should be noted that the stability of boost, inverting, and boost-buck converters have a well known zero in the right half plane caused by the inherent delay in their structure. All of these converters are of the form that charged up an inductive storage element and then transfer this energy to the load. As a result, an immediate command to increase the inductor current, delays the time when the current is transferred to the load. This delay momentarily increases the size of the output ripple while time is taken to build up the current inductor. This delay is a fundamental bandwidth limitation for conventional linear feedback controller. The Feedforward structure of these teachings is not sensitive to that delay.

In other systems such as a switched non-linear controller (such as in U.S. patent publications corresponding to U.S. patent application Ser. Nos. 11/558,638, 11/558,790, the above referenced US patent publications and the above referenced U.S. patent applications being both incorporated by reference herein), current feedforward becomes a load current predictor. The structure and training are performed the same way, but instead of predicting the duty cycle, the future load current is predicted. The methods of these teachings can be applied to those controllers.

It should be noted that although the above disclosure has related to switching power converters as the system of interest, the present teachings can also be applied to other systems, such as, but not limited to, process control in chemical plants, robots, and aircraft systems, in order to compensate or reject output load variations.

Although the invention has been described with respect to various embodiments, it should be realized these teachings is also capable of a wide variety of further and other embodiments within the spirit and scope of the appended claims.

What is claimed is:

1. A compensated switching power converter comprising:
    a switching power converter comprising:
        a circuit comprising at least two reactive components configured to provide an output voltage and capable of being switched from a first output voltage state to a second output voltage state and providing a load current to a load,
        a switching component capable of switching said circuit between said first output voltage state and said second output voltage state,
        a driver component capable of receiving an input control signal comprising a duty cycle signal and of driving the switching component in order to cause switching between said first output voltage state and said second output voltage state in response to set input control signal;
    a sensing component capable of providing a sensed output indicative of the load current; and
    a compensating component capable of receiving said sensed output and of providing a duty cycle adjustment signal, said duty cycle adjustment signal being combined with said duty cycle signal; said duty cycle adjustment signal being capable of substantially compensating for load current variations; said duty cycle adjustment signal being obtained from signals indicative of present and past load current variations.

2. The compensated switching power converter of claim 1 wherein said compensating component is a digital compensating component capable of receiving a digitized sensed output; said digitized sensed output being obtained from said sensed output.

3. The compensated switching power converter of claim 2 wherein said digital compensating component comprises a ratio of polynomials, each polynomial in said ratio of polynomials being a polynomial in a z-transform variable.

4. The compensated switching power converter of claim 2 wherein said digital compensating component comprises an adaptive digital compensating component.

5. The compensated switching power converter of claim 4 further comprising:
    a compensator design component capable of receiving a switching power converter output and a switching power converter input and of providing compensating component parameters to said adaptive compensating component.

6. The compensated switching power converter of claim 5 wherein said compensator design component utilizes an LMS algorithm.

7. The compensated switching power converter of claim 5 wherein said compensator design component utilizes an RLS algorithm.

8. The compensated switching power converter of claim 4 further comprising:
    an adaptive plant estimation component capable of receiving said digitized sensed output and a duty cycle input and of providing a model of a duty cycle to output voltage transfer function;
    a compensator design component capable of receiving the model of the duty cycle to output voltage transfer function and of providing compensator parameters;
    said digitized sensed output being provided to said adaptive plant estimation component.

9. The compensated switching power converter of claim 2 further comprising:
    a filter component, said filter component comprising an estimate of a duty cycle to output voltage transfer function for the switching power converter;
    said digitized sensed output being provided to said filter component; an output of said filter component being a filtered sensed output; and
    a compensator design component capable of receiving said filtered sensed output and a digitized input signal and of providing compensating component parameters to said adaptive compensating component; said digitized input signal being obtained from an input signal of said switching power converter.

10. The compensated switching power converter of claim 9 further comprising:
    a sampling component capable of sampling an output and an input signal from said switching power converter;
    an input parameter obtaining component capable of receiving the sampled output and the input signal and of obtaining sampled values for a plurality of input parameters; and
    a system design component capable of receiving said sampled values for said plurality of input parameters and of providing filter component parameters.

11. The compensated switching power converter of claim 10 wherein said sampling component is capable of sampling said sensed output and an input signal from said switching power converter at a first sampling rate, said first sampling rate being at least equal to a predetermined operating rate;
    wherein said input parameter obtaining component is capable of receiving the sensed output and the input signal sampled at the first sampling rate and of obtaining values for a plurality of input parameters, said values for said plurality of input parameters being sampled at said first sampling rate; and
    the compensated switching power converter further comprises:
        a decimator component capable of receiving said values for said plurality of input parameters sampled at the first sampling rate and of providing subsampled values for said plurality of input parameters, said subsampled values being sampled at a second sampling rate, said second sampling rate been slower than said first sampling rate; and
        said system design component being capable of receiving said subsampled values for said plurality of input parameters and of providing filter component parameters; values of said compensator parameters being sampled at the second sampling rate.

12. The compensated switching power converter of claim 11 wherein said sampling component is an analog to digital converter (ADC) capable of sampling an output signal from a system and an input signals from the system at a first sampling rate, said first sampling rate being at least equal to a predetermined operating rate.

13. The compensated switching power converter of claim 11 wherein said input parameter obtaining component is an autocorrelation and crosscorrelation estimator.

14. The compensated switching power converter of claim 11 wherein said sampling component is an oversampling modulator; and wherein said first sampling rate is an oversampled rate.

15. The compensated switching power converter of claim 1 wherein said compensating component comprises a ratio of polynomials, each polynomial in said ratio of two polynomials being a polynomial in a transform variable.

16. The compensated switching power converter of claim 1 further comprising:
a sampling component capable of sampling said sensed output and an input signal from said switching power converter at a first sampling rate, said first sampling rate being at least equal to a predetermined operating rate;
an input parameter obtaining component capable of receiving the sensed output and the input signal sampled at the first sampling rate and of obtaining values for a plurality of input parameters, said values for said plurality of input parameters being sampled at said first sampling rate;
a decimator component capable of receiving said values for said plurality of input parameters sampled at the first sampling rate and of providing subsampled values for said plurality of input parameters, said subsampled values being sampled at a second sampling rate, said second sampling rate been slower than said first sampling rate; and
a compensator design component capable of receiving said subsampled values for said plurality of input parameters and of providing compensator parameters; values of said compensator parameters being sampled at the second sampling rate; said compensator design component being capable of providing said values of said compensator parameter to said compensating component.

17. The compensated switching power converter of claim 16 wherein said sampling component is an analog to digital converter (ADC) capable of sampling an output signal from a system and an input signals from the system at a first sampling rate, said first sampling rate being at least equal to a predetermined operating rate.

18. The compensated switching power converter of claim 16 wherein said input parameter obtaining component is an autocorrelation and crosscorrelation estimator.

19. The compensated switching power converter of claim 16 wherein said sampling component is an oversampling modulator; and wherein said first sampling rate is an oversampled rate.

20. The compensated switching power converter of claim 16 wherein said oversampling modulator is a sigma delta modulator.

21. The compensated switching power converter of claim 4 further comprising:
a compensator design component capable of receiving the digitized sensed output and of providing compensating component parameters to said adaptive compensating component; said compensator design component comprising a learning function; said learning function being trained in order to provide said compensating component parameters; and
the digitized sensed output being provided to said compensator design component.

22. The compensated switching power converter of claim 21 wherein said learning function comprises a cerebellar model arithmetic computer (CMAC).

23. The compensated switching power converter of claim 21 wherein said adaptive compensating component comprises a non-linear lookup function.

24. The compensated switching power converter of claim 21 wherein said adaptive compensating component and said compensator design component are incorporated in a component capable of learning/being trained.

25. The compensated switching power converter of claim 2 further comprising:
a filter component, said filter component comprising an estimate of a duty cycle to output voltage transfer function for the switching power converter;
the digitized sensed output being provided to said filter component; an output of said filter component being a filtered sensed output; and
a compensator design component capable of receiving the filtered sensed output and of providing compensating component parameters to said adaptive compensating component; said compensator design component comprising a learning function; said learning function being trained in order to provide said compensating component parameters.

26. The compensated switching power convener of claim 25 further comprising:
a sampling component capable of sampling an output and an input signal from said switching power converter;
an input parameter obtaining component capable of receiving the sampled output and the input signal sampled and of obtaining sampled values for a plurality of input parameters; and
a system design component capable of receiving said sampled values for said plurality of input parameters and of providing filter component parameters.

27. The compensated switching power converter of claim 25 wherein said learning function comprises a cerebellar model arithmetic computer (CMAC).

28. The compensated switching power converter of claim 25 wherein said adaptive compensating component comprises a non-linear lookup function.

29. The compensated switching power converter of claim 25 wherein said adaptive compensating component and said compensator design component are incorporated in a component capable of learning/being trained.

30. A system comprising:
a sensing component capable of providing a sensed output indicative of an output load;
an adaptive digital compensating component capable of receiving said sensed output and of providing an adjustment signal, said adjustment signal being combined with a control input signal; said adjustment signal being capable of substantially compensating for output load variations; said adjustment signal being obtained from signals indicative of present and past output load variations; said adaptive digital compensating component capable of receiving a digitized sensed output; said digitized sensed output being obtained from said sensed output; and
a compensator design component capable of receiving said digitized sensed output and of providing compensating component parameters to said adaptive compensating component; said compensator design component comprising a learning function; said learning function being trained in order to provide said compensating component parameters;
said digitized sensed output being provided to said compensator design component.

31. The system of claim 30 further comprising:
a filter component, said filter component comprising an estimate of a control input signal to output signal transfer function for the system;
the digitized sensed output being provided to said filter component; an output of said filter component being a filtered sensed output;
said compensator design component being capable of receiving the filtered sensed output.

32. The system of claim 31 further comprising:
a sampling component capable of sampling an output and an input signal from the system;
an input parameter obtaining component capable of receiving the sampled output and the input signal sampled and of obtaining sampled values for a plurality of input parameters; and
a system design component capable of receiving said sampled values for said plurality of input parameters and of providing filter component parameters.

33. The system of claim 30 wherein said learning function comprises a cerebellar model arithmetic computer (CMAC).

34. The system of claim 30 wherein said adaptive compensating component comprises a non-liner lookup function.

35. The system of claim 30 wherein said adaptive compensating component and said compensator design component are incorporated in a component capable of learning/being trained.

* * * * *